US010691668B2

(12) United States Patent
Blank et al.

(10) Patent No.: US 10,691,668 B2
(45) Date of Patent: Jun. 23, 2020

(54) MOBILE MACHINE-GENERATED DATA CORRECTION

(71) Applicant: Deere & Company, Moline, IL (US)

(72) Inventors: Sebastian Blank, Bettendorf, IA (US); Dohn W. Pfeiffer, Bettendorf, IA (US); Robert A. Stevens, Moline, IL (US)

(73) Assignee: Deere & Company, Moline, IL (US)

( * ) Notice: Subject to any disclaimer, the term of this patent is extended or adjusted under 35 U.S.C. 154(b) by 147 days.

(21) Appl. No.: 15/247,003

(22) Filed: Aug. 25, 2016

(65) Prior Publication Data

US 2018/0060375 A1 Mar. 1, 2018

(51) Int. Cl.
*G06F 16/23* (2019.01)
*B60K 31/02* (2006.01)
*G06F 17/18* (2006.01)

(52) U.S. Cl.
CPC .......... *G06F 16/2365* (2019.01); *B60K 31/02* (2013.01); *G06F 17/18* (2013.01)

(58) Field of Classification Search
CPC ......... G06F 17/30371; G06F 17/30303; G06F 17/30011; G06F 17/30569; G06F 21/6218
USPC ........................................................ 707/687
See application file for complete search history.

(56) References Cited

U.S. PATENT DOCUMENTS

| | | | |
|---|---|---|---|
| 5,995,895 A | 11/1999 | Watt et al. | |
| 7,035,877 B2* | 4/2006 | Markham | B23Q 35/12 |
| 2009/0158430 A1* | 6/2009 | Borders | G06F 21/552 |
| | | | 726/23 |
| 2012/0036016 A1* | 2/2012 | Hoffberg | G05B 15/02 |
| | | | 705/14.58 |
| 2012/0086568 A1* | 4/2012 | Scott | G05B 15/02 |
| | | | 340/501 |
| 2013/0041549 A1 | 2/2013 | Reeve et al. | |
| 2013/0159021 A1* | 6/2013 | Felsher | G06F 19/328 |
| | | | 705/3 |
| 2014/0156806 A1* | 6/2014 | Karpistsenko | G06F 17/30557 |
| | | | 709/219 |
| 2014/0310231 A1 | 10/2014 | Sampathkumaran | |
| 2014/0324469 A1 | 10/2014 | Reiner | |
| 2014/0369558 A1* | 12/2014 | Holz | G06K 9/00201 |
| | | | 382/103 |
| 2016/0072891 A1* | 3/2016 | Joshi | G06Q 30/0269 |
| | | | 370/254 |

(Continued)

OTHER PUBLICATIONS

European Patent Application No. 17184799 Extended Search Report dated Jun. 4, 2018, 8 pages.

*Primary Examiner* — Hosain T Alam
*Assistant Examiner* — Nicholas E Allen
(74) *Attorney, Agent, or Firm* — Joseph R. Kelly; Kelly, Holt & Christenson, PLLC

(57) ABSTRACT

Machine-generated data is divided into its metadata (or contextual data) that is indicative of a data container, and the data values themselves that are indicative of sensed variables. The metadata is checked to obtain a container integrity indicator of whether the data is accurate based on characteristics of the data container. The actual data values are subjected to quality checking to determine whether they have been corrupted by inaccuracies. Data corresponding to inaccurate metadata or inaccurate data values themselves is quarantined, and correction logic attempts to correct any inaccurate data. Corrected data is output with the verified data.

19 Claims, 10 Drawing Sheets

(56) References Cited

U.S. PATENT DOCUMENTS

2016/0099963 A1* 4/2016 Mahaffey ............ H04L 63/1433
                                                      726/25
2016/0102879 A1* 4/2016 Guest .................... F24F 11/006
                                                      700/276
2016/0109875 A1* 4/2016 Majewski ........... G06F 21/6218
                                                      700/98

* cited by examiner

US 10,691,668 B2

MOBILE MACHINE-GENERATED DATA CORRECTION

FIELD OF THE DESCRIPTION

The present description relates to a data correction system. More specifically, the present description relates to correction of machine-generated data on a mobile machine.

BACKGROUND

There are many different types of mobile machines. Some such mobile machines include agricultural machines, construction machines, forestry machines, turf management machines, among others.

Many of these types of machines have machine-generated sensors that sense a variety of different variables. The variables can be on the machine itself, or they can be in the environment surrounding the machine. For instance, an agricultural machine may have sensors that sense such things as machine settings, machine orientation, machine location and speed, and other machine operating variables. The same machine may have sensors that sense soil characteristics, such as soil moisture and agricultural crop characteristics.

The sensors generate signals indicative of the sensed variables and the value of the sensed variables can be obtained from the sensor signals. Those values can be used to adjust controllable subsystems on the machine, or they can be stored for processing or later analysis by another system. They can also be used to generate other values indicative of additional parameters.

The data collected in this type of environment can be relatively prone to error. The environment can have dust, and a wide variety of other debris that can cause sensors and other electronics to malfunction or work intermittently. Similarly, such an environment can be prone to relatively high levels of electromagnetic interference from the various items operating on the machine. Thus, the data can be missing (such as where a sensor or other item malfunctions or malfunctions intermittently) or it can be corrupted by a variety of other types of noise or inaccuracies.

The discussion above is merely provided for general background information and is not intended to be used as an aid in determining the scope of the claimed subject matter.

SUMMARY

Machine-generated data is divided into its context data that is indicative of a data container and the data values themselves that is indicative of sensed variables. The context data is checked to obtain a container integrity value indicative of whether the data is accurate based on characteristics of the data container. The actual data values are subjected to quality checking to determine whether they have been corrupted by inaccuracies. Data corresponding to inaccurate context data or inaccurate data values themselves is quarantined and correction logic is applied to correct any inaccurate data. Corrected data is output with verified data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
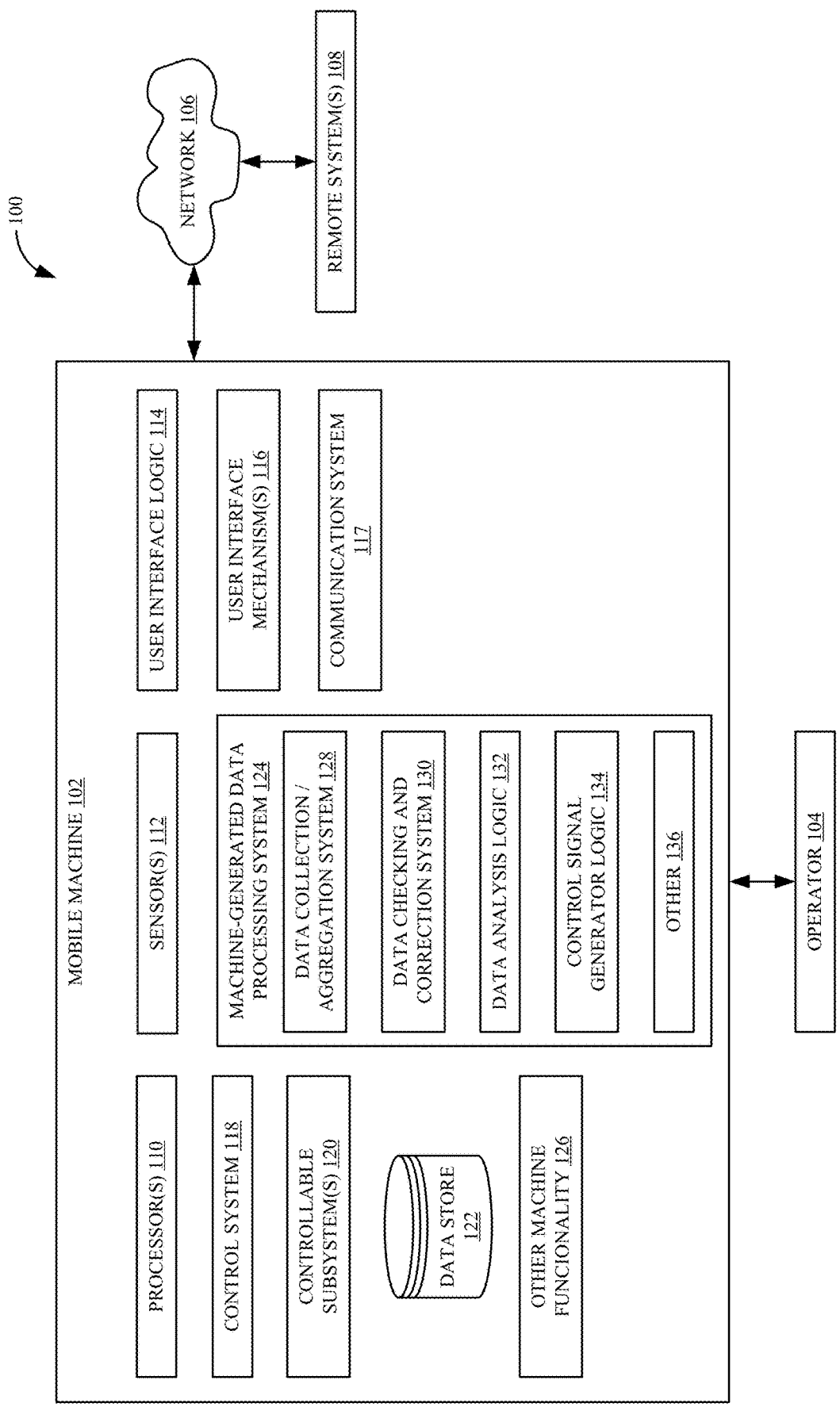
FIG. 1 is a block diagram of one example of a mobile machine architecture.

FIG. 1 is a block diagram of one example of a mobile machine architecture 100. Architecture 100 illustratively includes mobile machine 102 that is operated by an operator 104. In the example shown in FIG. 1, mobile machine 102 can also communicate over network 106 with one or more remote systems 108. Mobile machine 102 can be any of a wide variety of different types of mobile machines. For instance, it can be an agricultural machine (such as a harvester or other agricultural machine), a construction machine, a forestry machine, a turf management machine, etc.

Machine 102 illustratively includes one or more processors 110, sensors 112, user interface logic 114, user interface mechanisms 116, one or more communication systems 117, control system 118, and one or more controllable subsystems 120. It can also include data store 122, machine-generated data processing system 124, and a wide variety of other machine functionality 126. Machine-generated data processing system 124 can include data collection/aggregation system 128, data checking and correction system 130, data analysis logic 132, control signal generator logic 134, and it can include other items 136. Before describing machine-generated data processing system 124 and its operation in more detail, an overview of some of the items in architecture 100, and their operation, will first be provided.

User interface mechanisms 116 can include a wide variety of different types of interactions that provide a user interface for operator 104. For instance, they can include a steering wheel, joystick, levers, buttons, touch sensitive display devices, other display devices, haptic and audio output devices, among others. Operator 104 illustratively interacts with the user interface mechanisms 116 in order to control and manipulate machine 102. User interface logic 114 illustratively detects the user inputs through the user interface mechanisms 116 and provides an indication of those inputs to various other items in mobile machine 102.

Sensors 112 can sense a wide variety of variables. The variables can be on mobile machine 102 itself or they can be in the environment of mobile machine 102. For instance, some sensors may sense machine speed, machine position, machine orientation, machine settings, machine heading, operational characteristics or variables of machine 102, or variables on other various subsystems on machine 102, among a wide variety of other things. Sensors 112 illustratively generate sensor signals indicative of the sensed variables. The sensor signals can be conditioned (such as linearized, amplified, normalized, filtered, etc.) by conditioning logic. Processor 110 and control system 118 can illustratively generate values for the sensed variables, based upon the conditioned sensor signals.

Machine-generated data processing system 124 illustratively checks the data to determine whether system 124 can identify any inaccuracies in the data. In doing so, data collection/aggregation system 128 illustratively collects and aggregates the data into data packets. Each data packet can include data values that represent the sensed variables in addition to context data (or metadata) that identifies various characteristics or attributes of a container for the data. The container may indicate a geographic location where the machine 102 resided when the data was sensed. The geographic location can be, for instance, an agricultural field (when machine 102 is an agricultural machine) or a worksite (when machine 102 is a construction or forestry machine), etc. Data checking and correction system 130 illustratively checks both the data values themselves and the metadata in an attempt to identify inaccuracies. It can also attempt to apply correction rules to correct those inaccuracies. Data analysis logic 132 can perform a wide variety of different types of analysis on the data and control signal generator logic 134 can generate control signals to control various portions of machine 102 (or other machines or systems) based upon the data. Control system 118 can receive the control signal and control various controllable subsystems 120 based upon the control signal. Control system 118 can also illustratively control any of a wide variety of other machine functionality 126. Data store 122 can be used to store the data on machine 102, and communication system 117 can be used to communicate the data (or parts of it) over network 106 to various remote systems 108.

Network 106 can be any of a wide variety of different types of networks that communication system 117 can use to communicate with remote systems 108. It can be a wide area network, a local area network, a near field communication network, a cellular communication network, a satellite communication network, among others. It can also be a network that is implemented using store-and-forward technology. Some of these and different types of networks are described in greater detail below.

Remote systems 108 can also be a wide variety of different types of remote systems. They can include a computing system that is accessible by a farm manager, by a construction manager, or by third parties. Such third parties may, for instance, include seed companies, fertilizer companies, or other chemical companies, machine vendors, machine service organizations, etc. They can include universities or other institutions or organizations, or they can be remote analysis systems that are used to analyze the data generated on machine 102, remotely. All of these and other architectures are contemplated herein.

Figure 2:
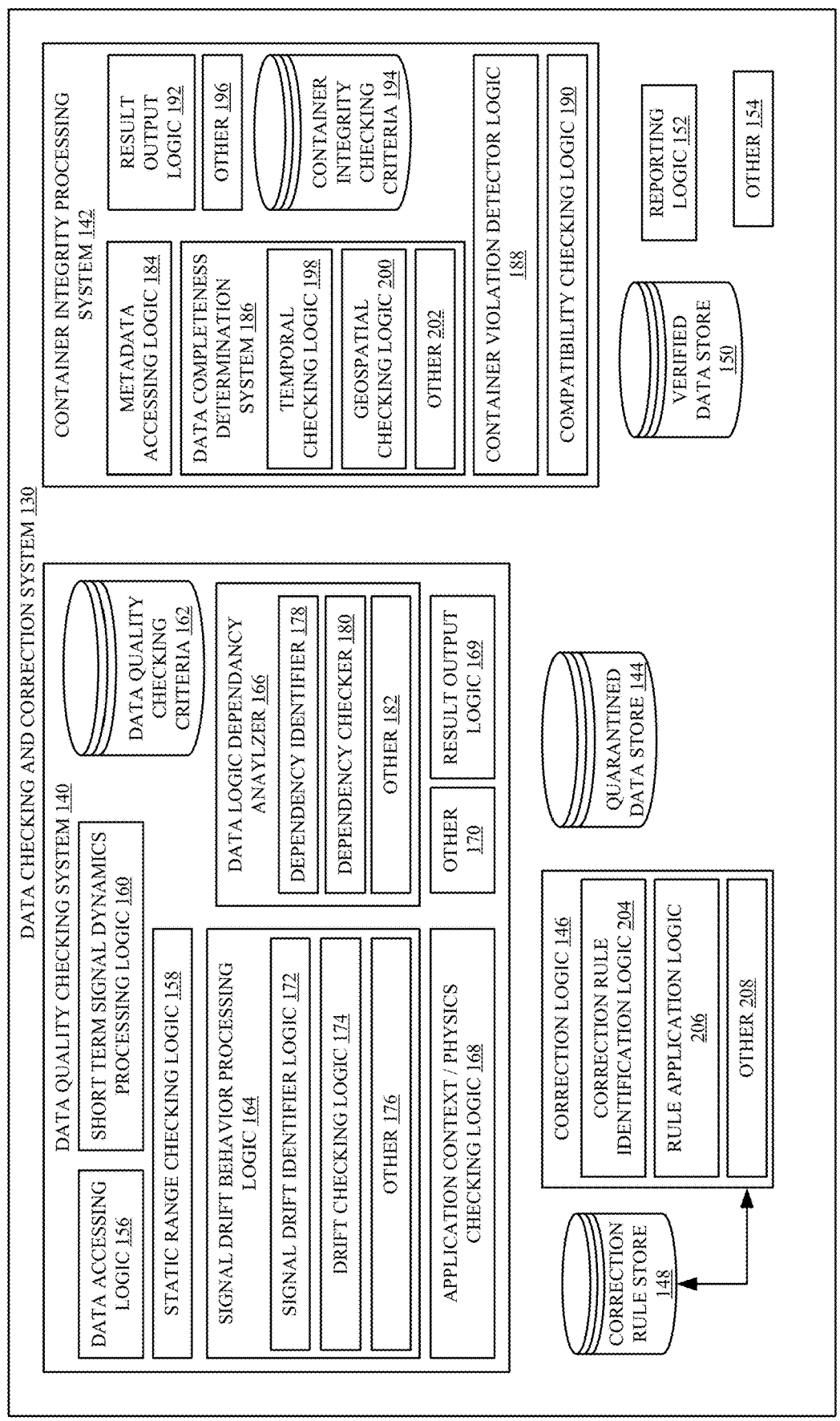
FIG. 2 is a more detailed block diagram of one example of a data checking and correction system.

FIG. 2 shows one example of the data checking and correction system 130 in more detail. Data checking and correction system 130 illustratively includes data quality checking system 140, container integrity processing system 142, quarantined data store 144, correction logic 146 that accesses correction rule store 148, verified data store 150, reporting logic 152, and it can include a wide variety of other items 154.

Data quality checking system 140, itself, illustratively includes data accessing logic 156, static range checking logic 158, short term signal dynamics processing logic 160, data quality checking criteria store 162, signal drift behavior processing logic 164, data logic dependency analyzer 166, application context/physics checking logic 168, result output logic 169, and it can include other items 170. Before describing the remainder of data checking and correction system 130, a brief overview of the items in data quality checking system 140 will first be provided.

Data accessing logic 156 accesses a data packet that was generated by data collection/aggregation system 128 on mobile machine 102 (shown in FIG. 1). The data packet may include metadata and data values. Data accessing logic 156 accesses the data values in the data packet. It then accesses data quality checking criteria 162 to identify the data quality checking criteria that are to be used for this particular type of data. For instance, different checking criteria may be used for different types of sensed data. By way of example, if one of the items of sensed data is machine speed, one of the data checking criteria may be a maximum vehicle speed for this vehicle. If the data value indicates that the vehicle is driving faster than its maximum speed, then this would be an erroneous piece of data. Of course, there are a wide variety of different types of data that can be sensed and included in any given data packet, so the data checking criteria will vary widely, based upon the particular type of data. Data accessing logic 156 retrieves and loads the appropriate data quality checking criteria into data quality checking system 140, for this particular type of data.

Static range checking logic 158 performs a static range check on the data, based upon the checking criteria. The static range checking logic 158 illustratively includes a static range for the data (such as a maximum value, a minimum value, both a minimum and maximum value, a value threshold, or other types of static criteria that can be used to perform a static check on the data value). It then checks the data value against the static range criteria to determine whether an error exists.

Short term signal dynamics processing logic 160 compares how the data values have changed over time, against signal dynamics criteria. The signal dynamics criteria are illustratively indicative of an expected range of values that show how much the signal changes over time. They may be frequency values indicating how quickly the signal changes over time, they may be size values indicating how much each signal value is expected to change over time, or a variety of other types of signal dynamics criteria. By way of example, if the particular piece of data is indicative of the vehicle speed, and during an immediately previous sampling period that data indicated that the vehicle was traveling at 30 miles per hour, but now that data indicates that the vehicle is stopped (e.g., traveling at 0 miles per hour) and the two samples were taken 10 milliseconds apart, then the signal dynamics criteria would tend to indicate that the signal value could not change so quickly, and this would indicate an error.

Signal drift behavior processing logic 164 illustratively includes signal drift identifier logic 172, drift checking logic 174, and it can include other items 176. Logic 164 is similar to logic 160, described above, except that it checks for longer term changes in the signal value, and compares them to checking criteria that indicate an expected change in the values over long term. Some signals may be expected to change, for example, over a single entire day. For instance, as the day progresses, the temperature normally rises and a material being processed (such as a crop, where machine 102 is an agricultural machine) may tend to be drier. Thus, the representative signal values for crop moisture may tend to decline as the day goes on. However, signal drift over a longer period of time may also be unexpected. This may help to identify sensor drift scenarios caused by wear or other reasons that may indicate an erroneous value. For instance, metadata such as weather data can be used to cross-check sudden changes in the crop moisture signal. If there is a sudden rise in sensed crop moisture and the weather metadata shows that it has begun to rain, this may indicate that the sensor is operating properly. Otherwise (if no rain is indicated), it may indicate that the sensor may be inaccurate. Thus, signal drift identifier logic 172 identifies the signal drift (if any) over the desired time period (which may change based upon the particular type of data being processed). Drift checking logic 174 then checks that signal drift against the signal checking criteria for that particular signal to determine whether the actual signal drift conforms to expected signal drift or whether it may indicate an error.

Data logic dependency analyzer 166, itself, illustratively includes dependency identifier 178, dependency checker 180, and it can include a wide variety of other items 182. It may be that a given data value is dependent on other (underlying) data values. If the underlying data value changes, that would necessarily mean that the dependent data value should also change. These dependencies can be captured in a dependency logic tree, or in another type of data structure that can be accessed from data quality checking criteria 162. The dependencies will, again, vary based upon the particular data item being processed. Thus, dependency identifier 178 accesses the dependencies for the particular data being processed from checking criteria 162. Dependency checker 180 then checks the data values to determine whether they are changing appropriately, (as expected) based upon that dependency. If not, it can indicate that the data may be inaccurate or in error.

Application context/physics checking logic 168 illustratively checks for errors based on limitations that may be introduced by physics and the particular context of the application in which the system is deployed. For instance, it may be impossible on a given machine for some functions to be simultaneously active. In addition, some of the sensed variables may only change if the corresponding system is active. Thus, if a system is not active, then the sensed variable should not change, if the system is operating properly. By way of example, if the mobile machine 102 is a combine harvester, then if the machine has crop material moving through it, the thresher must be operating. Therefore, if a sensor signal indicates that crop material is moving through the machine (such as a mass flow sensor), but the thresher is not operating, then this would tend to indicate that the mass flow sensor is malfunctioning. This is just one example. Logic 168 thus checks for errors that may not be able to be detected based on the isolated sensor measurement, itself, but can only be detected, based upon the context of the machine or the physics of the machine, etc.

Result output logic 169 outputs the results generated by system 140 and identifies the corresponding data values that spawned the results. This can be done in various ways, some of which are described below.

Container integrity processing system 142 illustratively includes metadata accessing logic 184, data completeness determination system 186, container violation detector logic 188, compatibility checking logic 190, result output logic 192, container integrity checking criteria 194, and it can include a wide variety of other items 196. Metadata accessing logic 184 illustratively identifies the metadata indicative of a type of container from which the data is gathered. As discussed above, the data may be formed into packets which include not only the data values themselves, but metadata defining the container, defining the type of data, etc. In one example, for instance, if the mobile machine 102 is an agricultural machine, then the container metadata may indicate that the data container is a particular field. It may, for instance, give a field identifier for the field, a geographic location of the field, and/or another indicator identifying that the data is being obtained from a field. If mobile machine 102 is a construction machine, then the container identifier may identify a particular job site.

Container integrity checking criteria 194 can include criteria that system 142 can use to check for errors in the data being collected, based upon the contextual data or data container from which the data is being collected. By way of example, there may be certain criteria that can be checked if the data is being gathered from an agricultural field. There may be other types of criteria that can be checked if the data is being gathered from a forestry or construction worksite. These are examples only. In one example, metadata accessing logic 184 accesses those criteria and loads them into system 142, so that the components of system 142 can check the metadata under analysis against those criteria, to identify errors. The particular criteria may vary widely, based upon the container type.

Data completeness determination system 186 illustratively includes temporal checking logic 198, geospatial checking logic 200, and it can include other items 202. Temporal checking logic 198 illustratively identifies whether the data values were received, temporally, in an expected way. For instance, the metadata may include a timestamp or other indicator indicating when a particular piece of data was collected (e.g., sensed). If the particular type of data being processed is supposed to be sensed every second, temporal checking logic 198 illustratively identifies whether this is occurring. If not, there may be gaps in the data which may render it less useful or less accurate.

Geospatial checking logic 200 checks to make sure that the data is being collected, geospatially, as desired. For instance, there may exist instances when some data is to be sensed and collected after a machine travels a particular distance. For instance, the sensed data may be collected every x meters of machine travel. Geospatial checking logic checks to determine whether this is occurring. Again, this may indicate an error.

Container violation detector logic 188 determines whether the metadata violates any container integrity checking criteria 194 for the particular container of the data. By way of example, assume that mobile machine 102 is an agricultural harvester that has a crop type sensor that senses or otherwise indicates a type of crop it is harvesting and that has a header which engages the crop being harvested. Assume also that the container is identified as a field. If the contextual data changes to indicate that the crop type has changed within a field, then this may be a violation of the container integrity checking criteria related to the container, as it would not be expected that two different crops are planted in the same field. Similarly, if the metadata changes to indicate that the header type changes within a given field, this may also indicate an error, as it would not be expected that the type of header being used to harvest a crop would change within a single field. Again, these are examples only.

Compatibility checking logic 190 can be employed to determine whether various different software applications or software modules being run on the machine have versions that are compatible with one another. This information can also be used to potentially identify errors in the data being collected.

Result output logic 192 illustratively outputs the results of the container integrity processing system 142. The results indicate the corresponding data that spawned the result.

Any data that was identified by either system 140 or system 142 as being erroneous is illustratively stored in quarantined data store 144. The remaining data, that is verified as being good data (or for which no likely errors were identified), is illustratively stored in verified data store 150. At that point, processing is not yet concluded, however, in accordance with one example. It may be that some of the quarantined data can be corrected. Correction logic 146 thus includes correction rule identification logic 204, rule application logic 206, and it can include other items 208. The different types of data or metadata that is being collected may fail or be inaccurate for a variety of known reasons that can be corrected with known fixes. In that case, correction rules for those types of errors can be stored in correction rule store 148. The correction rules stored in store 148 may identify the particular type of data or metadata, to which they can be applied to correct that data or metadata. They can be indexed in that way, or they can be arranged in store 148 in other ways so that they can be identified to correct the corresponding data to which they apply.

Correction rule identification logic 204 thus accesses quarantined data store 144 and identifies an item (or set) of quarantined data. The data will illustratively include its metadata that indicates the type of data, and it will also include the result of the error processing by systems 140 and 142, to indicate the type of error that was detected. Based upon the particular type of data, and the type of error, logic 204 can search correction rule store 148 to identify whether any correction rules are available to correct the data, given the data type and the type of failure. If so, it accesses that rule and provides it to rule application logic 206, along with the quarantined data being analyzed.

Logic 206 then attempts to apply the correction rule to the data to obtain corrected data. If it is successful, it may be fed through the data quality checking and correction processes again to determine whether it now reaches the requirements. When it has been corrected to a level where it is of adequate quality, then the corrected data is provided to verified data store 150, as verified data. If no correction rule is available, or if the application of a correction rule is unsuccessful, then correction logic 146 discards the quarantined data so that it is not used in later processing.

An example may be helpful. Assume that machine 102 has a wheel speed sensor that senses a speed of rotation of the machine's wheels. Assume that machine 102 also has a vehicle speed sensor that senses a travel speed of the vehicle based upon some other metric (such as the change in geographical position over time). Assume further that the wheel speed sensor indicates that the vehicle is traveling at 8 kilometers per hour, but the vehicle speed sensor indicates that the vehicle is traveling at 80 kilometers per hour. Assume also that the maximum speed of the vehicle is 30 kilometers per hour. This would indicate that the vehicle speed sensor should be divided by 10, and that it would be correct. It may also be that this is a common type of failure for the vehicle speed sensor, so that a correction rule is written for it, and is stored in correction rule store 148. Thus, when the value generated by the vehicle speed sensor is flagged as being erroneous (because it exceeds the maximum speed of the vehicle), it will be quarantined in quarantined data store 144. Correction rule identification logic 204, however, will identify a correction rule in store 148 that applies when the vehicle speed sensor is flagged as being erroneous because it is in excess of the maximum vehicle speed. It will access that rule and provide it to rule application logic 206 which applies the rule (by dividing the vehicle speed indicated by the vehicle speed sensor by 10). The rule will also indicate that the result of that division should be compared against the vehicle speed indicated by the wheel speed sensor and, if the two match (or match within a threshold amount), then the vehicle speed identified by the vehicle speed sensor, once corrected, may be verified and stored in verified data store 150. This is just one example and there are many other examples of correction rules that can be used, and they will differ based upon the type of data, the type of mobile machine 102, the type of container, etc.

Reporting logic 152 can illustratively be used to generate reports, either automatically or with manual interaction by operator 104 or another user. Logic 152 can use communication system 117 to communicate the reports to remote systems 108, or the reports can be stored locally or output in other ways.

Figure 3A:
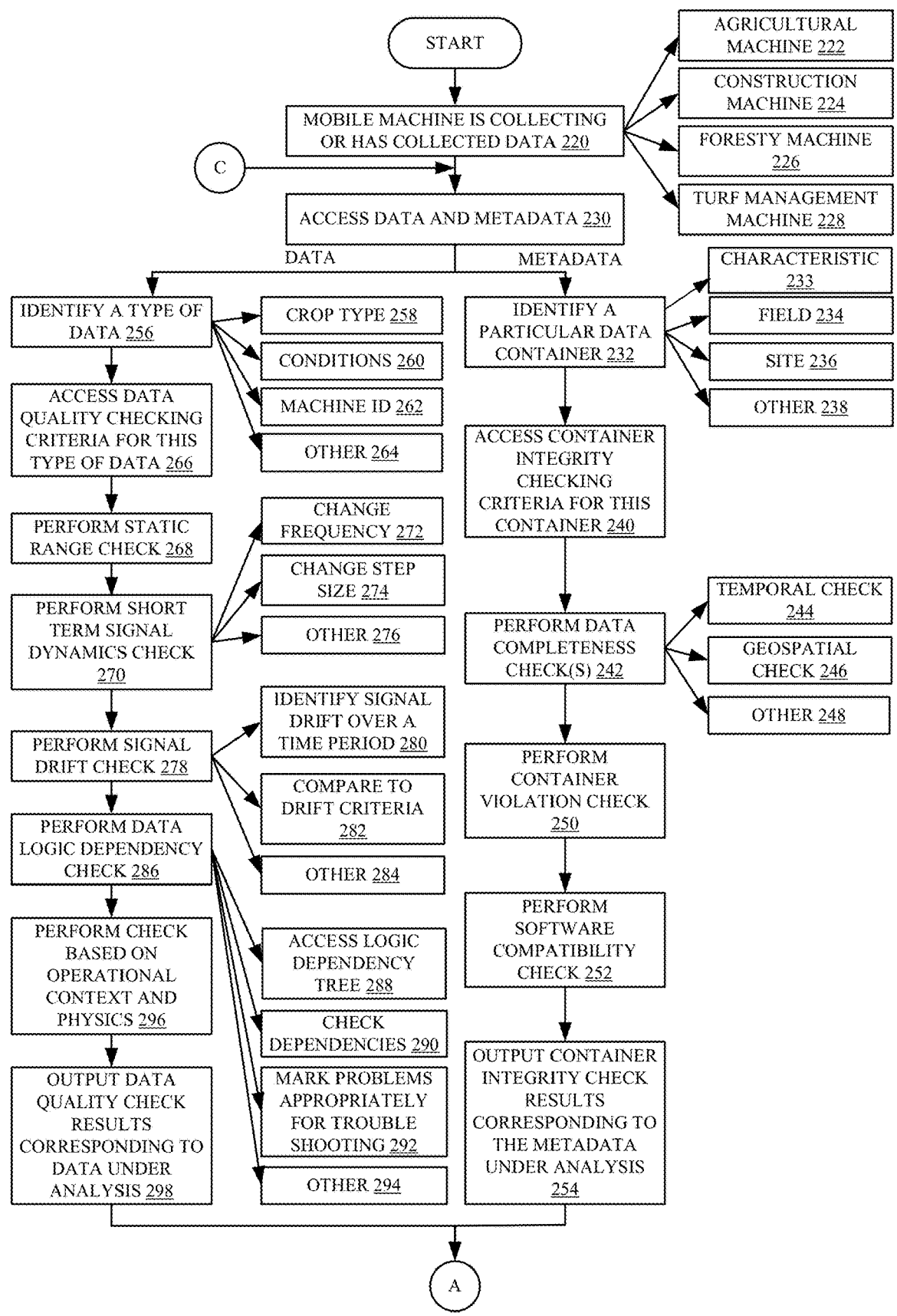
FIGS. 3A-3C (collectively referred to herein as FIG. 3) illustrate a flow diagram showing one example of the operation of the data checking and correction system shown in FIG. 2.
Figure 3B:
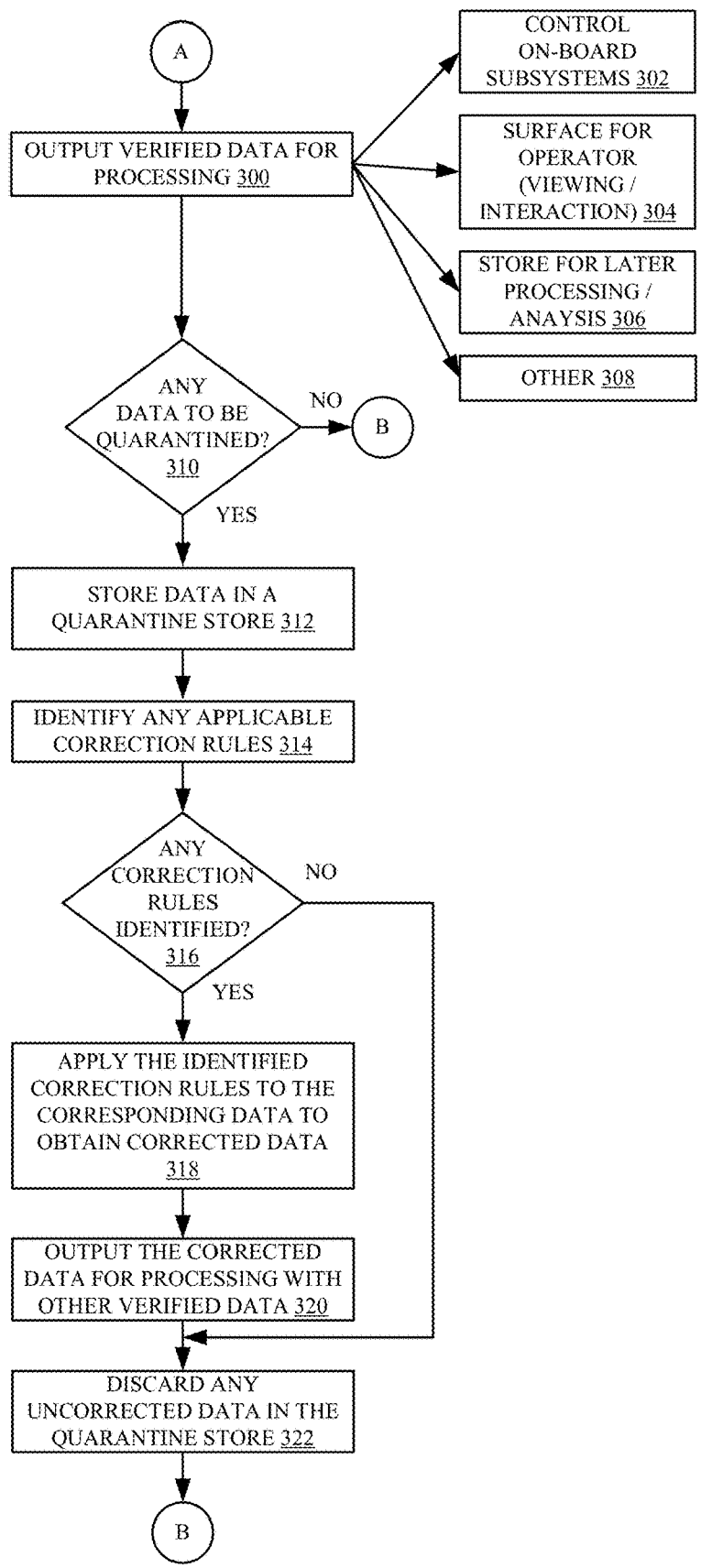
Figure 3C:
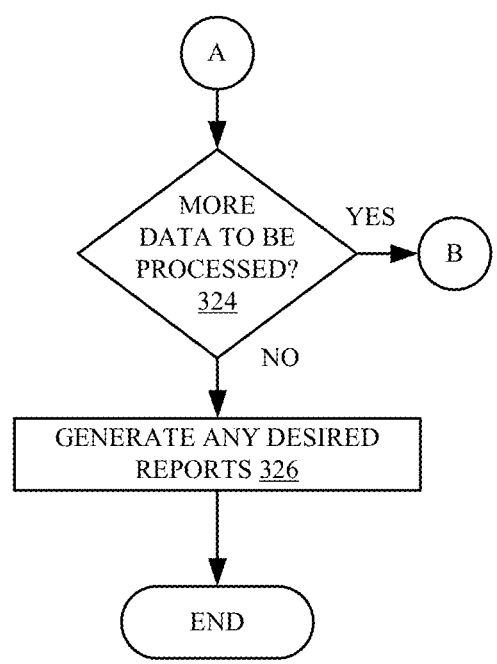

FIGS. 3A-3C (collectively referred to herein as FIG. 3) show a flow diagram illustrating one example of the operation of architecture 100 (and in particular, data checking and correction system 130) in performing data checking and correction on the machine-generated data that is generated by machine 102. It will be noted that this type of correction can be applied, in real time or near real time, as machine 102 is being run and as data is being collected, or it can apply after the fact, once the data has been collected. Thus, it is first assumed that mobile machine 102 is collecting, or has collected, data that is to be analyzed. This is indicated by block 220 in FIG. 3. Machine 102 can be an agricultural machine 222, a construction machine 224, a forestry machine 226, a turf management machine 228, or it can be another machine.

Data accessing logic 156 and metadata accessing logic 184 then access the data and metadata, respectively, that is to be analyzed as described above. This is indicated by block 230 in the flow diagram of FIG. 3. It will be noted that the data and metadata can be analyzed and processed by systems 140 and 142 either simultaneously or sequentially. For instance, it may be that the metadata can be checked more quickly than the actual data values. Therefore, it may be more beneficial to check the metadata first to determine whether any uncorrectable errors exist in the data so that the data values need not be processed at all. This is just one example. In the present discussion, it will be assumed that the metadata is checked first, and the description will proceed in that way. This is an example only, and the data values can be checked first or the metadata and the data values can be checked first or the metadata and data can be checked simultaneously or the checking could switch between data and metadata, as desired. All of these are contemplated herein.

In accordance with the present description, however, metadata accessing logic 184 accesses the metadata (or context data) for a data packet under analysis and identifies a particular type of container, based on that metadata. This is indicated by block 232. For example, the metadata may indicate a characteristic 233 of the data (such as crop type, crop season, etc.). It may also indicate that the container is an agricultural field 234, a forestry, construction or turf manage worksite 236, or any of a variety of other containers 238. It then accesses container integrity checking criteria 194 for this type of container, and it can load them into the various other components or systems or logic in system 142. This is indicated by block 240.

Data completeness determination system 186 then performs data completeness checks on the data, based upon the container integrity checking criteria. This is indicated by block 242. For instance, temporal checking logic 198 can perform a temporal check 242. Geospatial checking logic 200 can perform a geospatial check 246. Other completeness checks 248 can also be performed.

Container violation detector logic 188 then performs a container violation check. This is indicated by block 250, some examples of this are also described above.

Compatibility checking logic 190 can then perform any software compatibility checks that are desired. This is indicated by block 252.

Result output logic 192 then outputs the container integrity check results corresponding to the metadata under analysis. This is indicated by block 254. As described above, it can provide an identifier identifying the particular data values (or data packet) that the results correspond to. If any errors are identified, it can also provide an indicator identifying the error that was detected as well.

Referring now to the operation of data quality checking system 140, data accessing logic 156 checks the data to be analyzed and identifies the type of data under analysis. This is indicated by block 256 in the flow diagram of FIG. 3. For instance, as one example only, the data may indicate a crop type 258, the weather conditions 260 under which the data was collected, a machine identifier 262 identifying a particular machine or model of machine on which the data was collected, and/or a wide variety of other conditions or indicators specifying or defining the type of data and the conditions under which it was obtained, as indicated by block 264. Logic 156 then accesses the data quality checking criteria 166 for the particular type of data identified at step 256. This is indicated by block 266. By way of example, if the type of data under analysis is for a corn crop under wet conditions using a particular machine, the checking criteria 162 may be different than those that would be identified for a corn crop under dry conditions using that same machine. This is one example and a wide variety of other parameters can be used to delineate the different sets of data quality checking criteria 162 that may be used in system 140. The data quality checking criteria that are identified are illustratively loaded into the various systems, logic, and components in data quality checking system 140.

Static range checking logic 158 then performs any static data minimum value and maximum value range checking as described above. This is indicated by block 268. Short term signal dynamics processing logic 160 then performs any short term signal dynamics checks as also described above. This is indicated by block 270. For instance, the checks may be based upon a frequency with which data changes as indicated by block 272 by a step size with which the data changes from one sample to the next, as indicated by block 274, or for a wide variety of other dynamic reasons, as indicated by block 276.

Signal drift behavior processing logic 164 then performs any signal drift checking on the data. This is indicated by block 278. By way of example, signal drift identifier logic 172 can identify the signal drift over a given time period for the particular data under analysis. This is indicated by block 280. As discussed above, the time period may vary with the type of data being collected, the conditions under which it was collected, etc.

Drift checking logic 174 then checks the identified signal drift against drift criteria. This is indicated by block 282. If that comparison indicates that the signal drift shows an error, then this is identified. The signal drift check can be performed in other ways as well, and this is indicated by block 284.

Data logic dependency analyzer 166 then performs any data logic dependency checking on the data under analysis. This is indicated by block 286. In one example, it accesses a dependency logic tree from data quality checking criteria 162 that identifies any dependencies for the data under analysis. This is indicated by block 288. Dependency checker 180 then checks the dependencies to determine whether the signal values reflect those dependencies. If not, this can be used to identify upstream data issues in the derived data due to data issues in the originally captured data. Thus, it can be used to more quickly identify the root causes of issues. This is indicated by block 290. As discussed above, if an underlying signal has changed and a dependent signal should also change, but it has not (or if it has changed in an improper way), then this can be identified as a potential error. These problems can be marked appropriately for troubleshooting. This is indicated by block 292. For instance, if a value is based upon two different signals and one of them is changing appropriately, but the other is not, then the system may simply identify the signal that is not changing appropriately as being potentially faulty. This can be done instead of marking both underlying signals, since one is actually changing as expected. The dependency checking can be done in a wide variety of other ways as well, and this is indicated by block 294.

Application context/physics checking logic 168 then performs any checking based upon the operational application context and physics within which the system is deployed. Some examples of this are described above as well, and this is indicated by block 296 in the flow diagram of FIG. 3.

Result output logic 169 then outputs the data quality check results corresponding to the data under analysis. This is indicated by block 298. In one example, it identifies the data as being either in error or verified. It can also identify, if the data is in error, the error that occurred or was detected with respect to the data.

Once all of the verifications or checks have been performed by systems 140 and 142 with respect to a set of data under analysis, the verified data is illustratively output to verified data store 150. It can be accessed for various different types of processing. This is indicated by block 300. For example, control signal generator logic 134 (shown in FIG. 1) can generate a control signal that is provided to control system 118, which uses it to control one or more different controllable subsystems 120. Controlling onboard subsystems based upon the verified data is indicated by block 302. The verified data can also be surfaced for operator 104 for viewing or interaction. This is indicated by block 304. The verified data can be stored for later processing or analysis (such as by a remote system 108, or otherwise). This is indicated by block 306. The data can be output for processing in other ways as well, and this is indicated by block 308.

If any data was marked as erroneous, and is to be quarantined, then it is stored in quarantined data store 144. This is indicated by blocks 310 and 312 in FIG. 3. If data is quarantined, then correction rule identification logic 204 identifies any applicable correction rules in correction rule store 148 for the quarantined data. This is indicated by block 314. If any correction rules are identified, then rule application logic 206 attempts to apply the identified correction rules to the corresponding data to obtain corrected data. This is indicated by blocks 316 and 318 in FIG. 3. If corrected data is obtained, that corrected data is output for processing with the other verified data. For instance, it can be output to verified data store 150, used to control onboard controllable subsystems surfaced for the operator. stored for later processing, or it can be output in other ways. Outputting the corrected data is indicated by block 320 in FIG. 3.

Any quarantined data that cannot be corrected is archived in a different data store, so that it does not influence any future processes or analysis. This is indicated by block 322.

As long as there is more data to be processed, the processing reverts to block 230 described above. This is indicated by block 324. At any point during the processing, reporting logic 152 can automatically (or under manual control of a user) generate any desired reports. This is indicated by block 326. As discussed above, the reports can be stored locally, communicated to remote systems 108, surfaced for operator 104 or another user, or used in other ways.

It can thus be seen that the present description greatly enhances the accuracy of the data collection and machine control of mobile machine 102. By increasing the accuracy of the machine-generated data that is used for controlling the machine, the present system greatly enhances the accuracy of the control algorithms and even the accuracy of the manual control of machine 102, because the underlying data is more accurate.

It will be noted that the above discussion has described a variety of different systems, components and logic. It will be appreciated that such systems, components and logic can be comprised of hardware items (such as processors and associated memory or other processing components, some of which are described below) that perform the functions associated with those systems, components and logic. In addition, the systems, components and logic can be comprised of software that is loaded into memory and is subsequently executed by a processor, server, or other computing component, as described below. The systems, components and logic can also be comprised of different combinations of hardware, software, firmware, etc., and some examples are described below. These are only illustrative examples of different structures that can be used to form the systems, components and logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device, such as a track ball or mouse. They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. And, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

In addition, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 4:
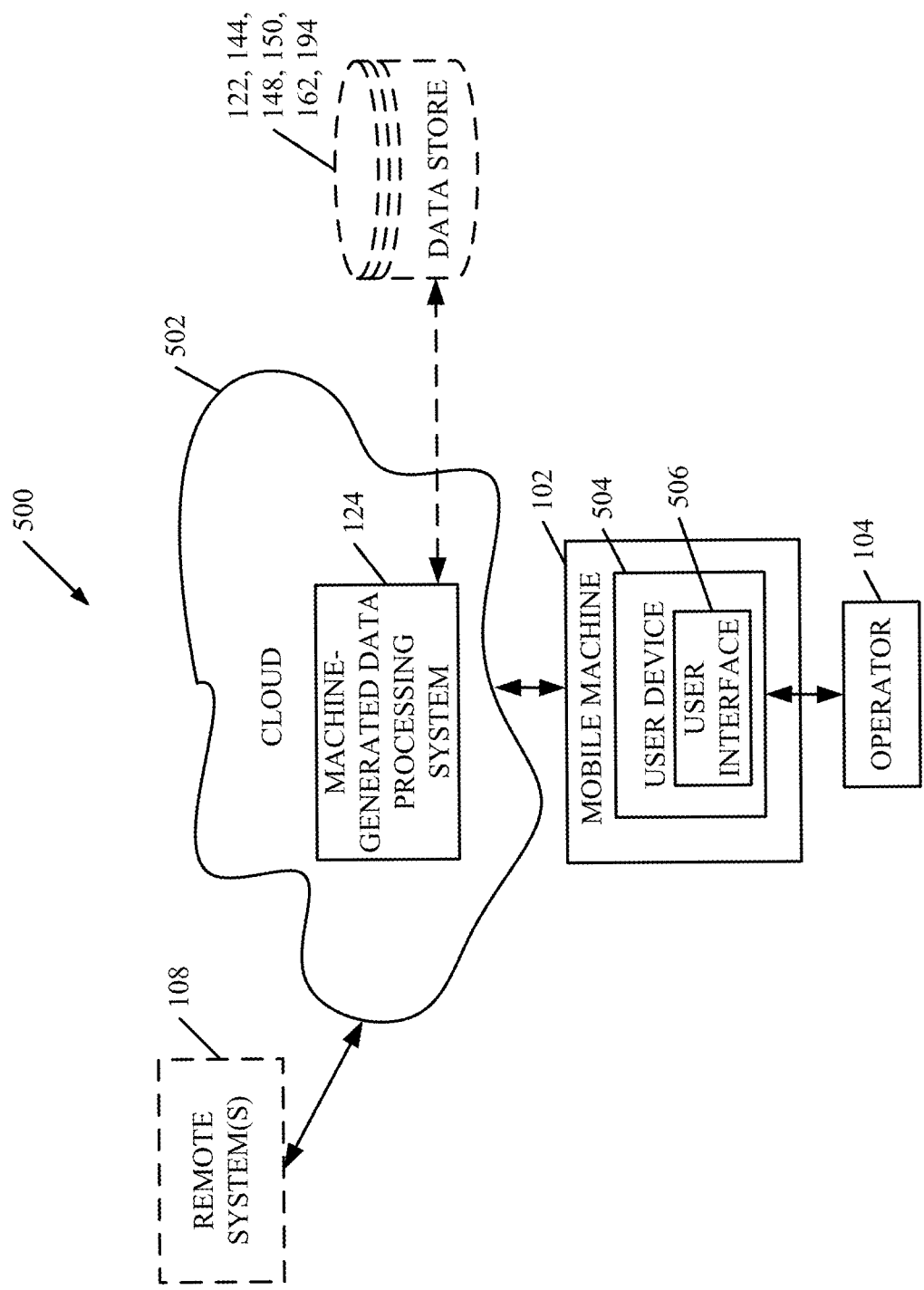
FIG. 4 is a block diagram showing one example of the architecture shown in FIG. 1, deployed in a remote server environment.

FIG. 4 is a block diagram of architecture 100, shown in FIG. 1, except that it is deployed in a remote server architecture 500. As an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIGS. 1 and 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 4, some items are similar to those shown in FIG. 1, and they are similarly numbered. FIG. 4 specifically shows that machine-generated data processing system 124 can be located at a remote server location 502. Therefore, machine 102 accesses those systems through remote server location 502. Operator 104 can use a user device 504 to access user interfaces 506 as well.

FIG. 4 also depicts another example of a remote server architecture. FIG. 4 shows that it is also contemplated that some elements of FIG. 1 are disposed at remote server location 502 while others are not. By way of example, storage 122, 144, 148, 150, 162 and/or 194 or remote systems 108 can be disposed at a location separate from location 502 and accessed through the remote server at location 502. Regardless of where they are located, they can be accessed directly by mobile machine 102, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein.

Further, the information can be stored on the harvester until the harvester enters a covered location. Alternatively, harvester itself can then send the information to the main network when near a network portal.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
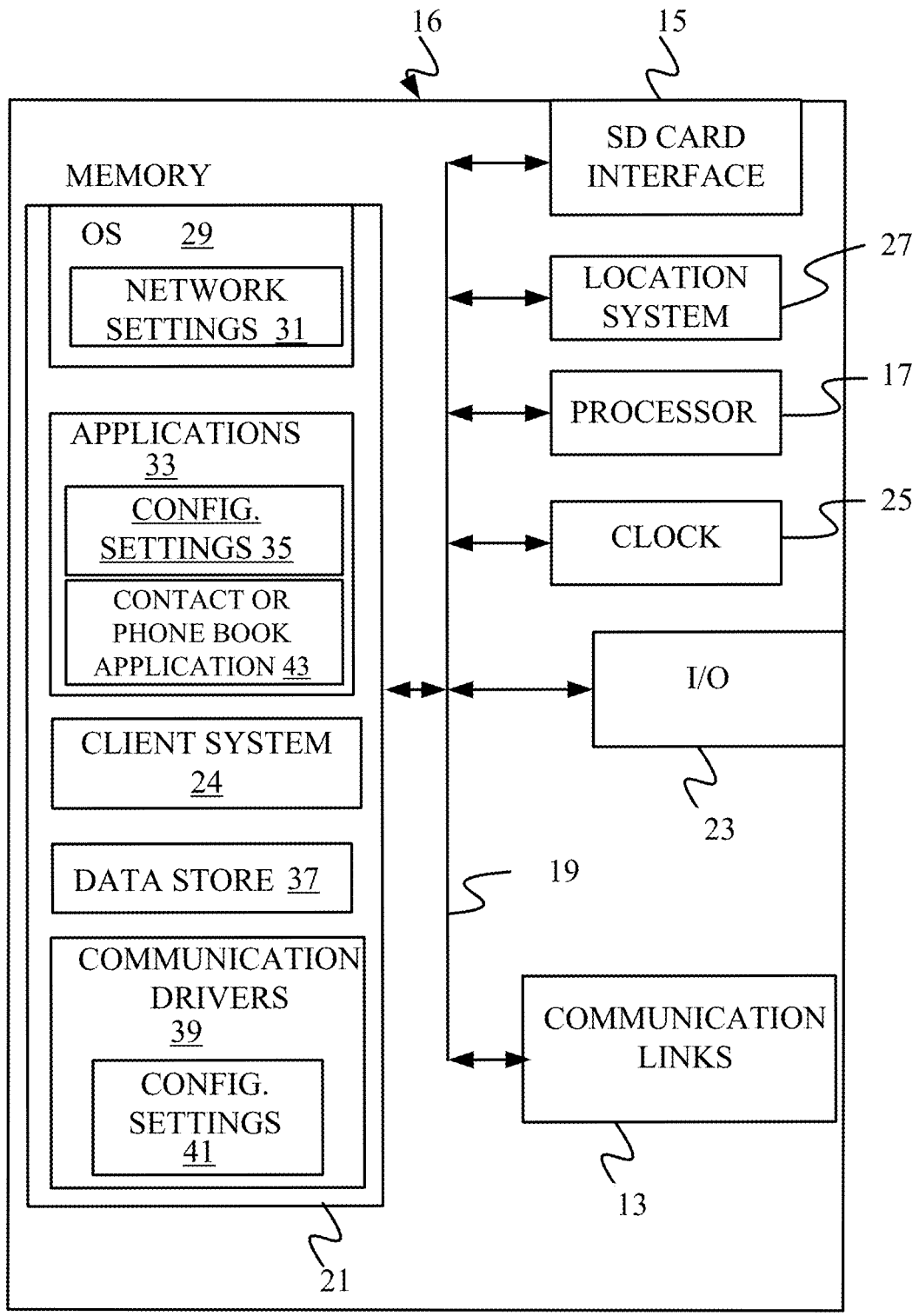
FIGS. 5-7 show examples of mobile devices that can be used in the architectures shown in previous Figures.
Figure 6:
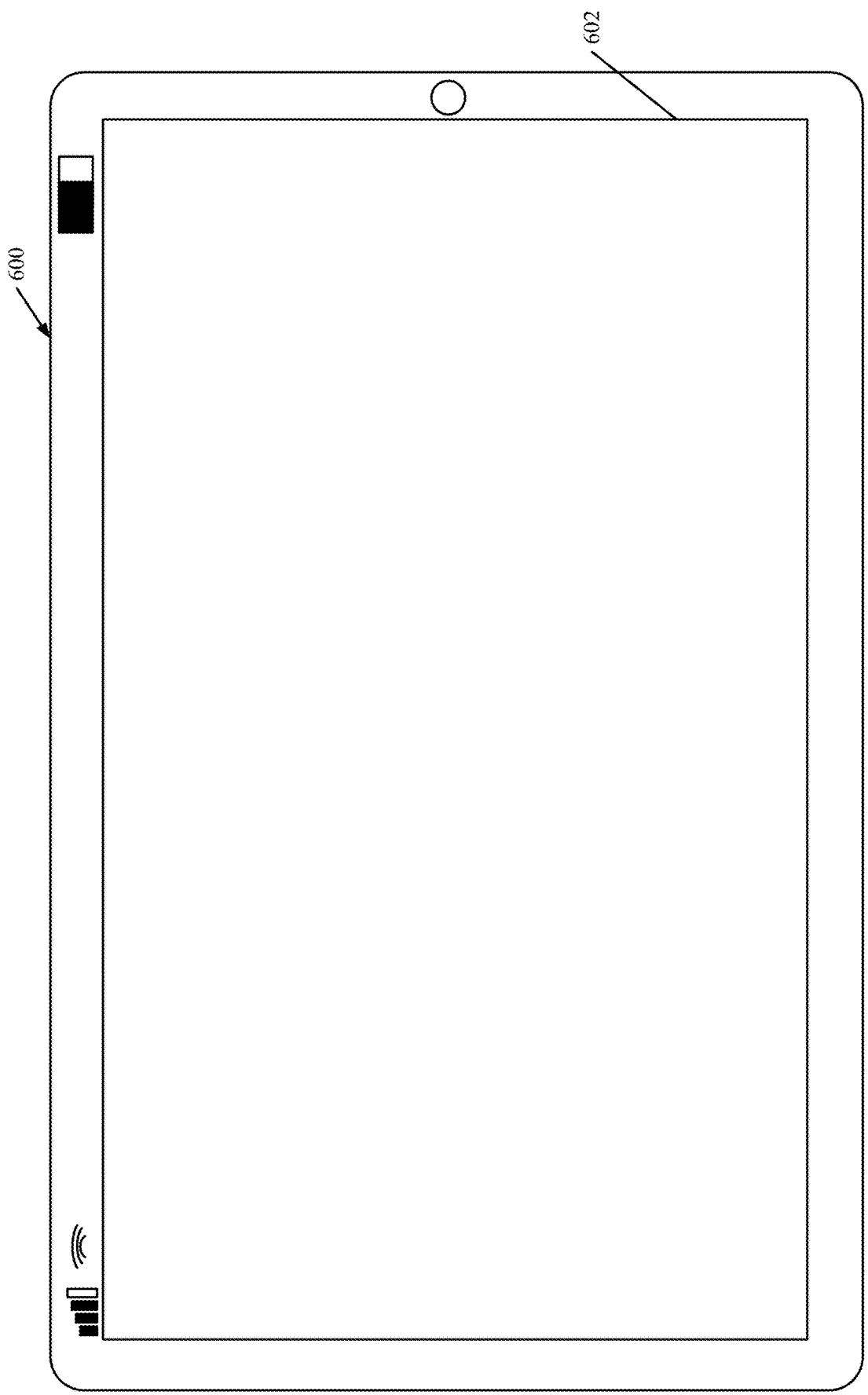
Figure 7:
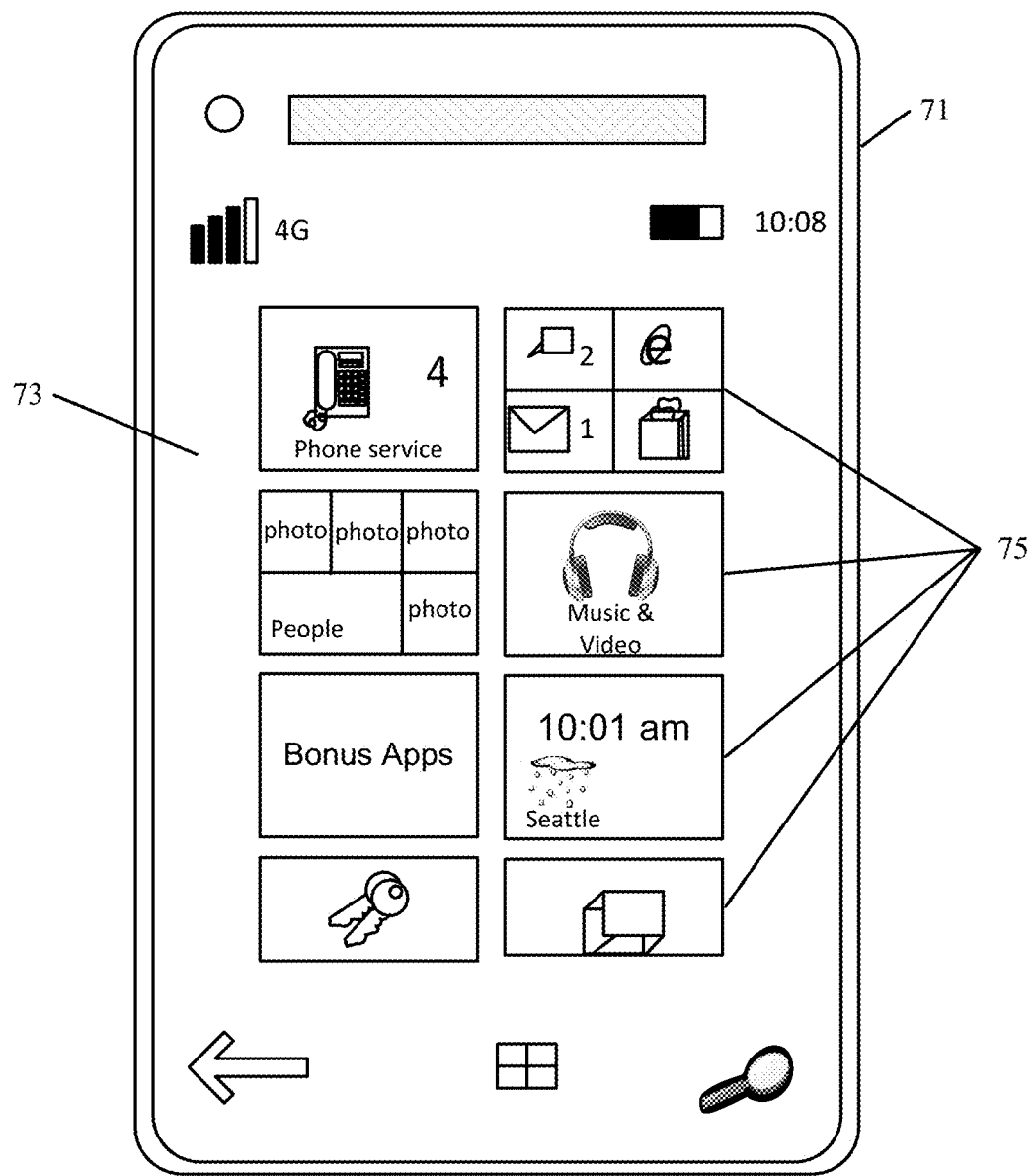

FIG. 5 is a simplified block diagram of one illustrative example of a handheld or mobile computing device that can be used as a user's or client's hand held device 16 (e.g., as device 504 in FIG. 4), in which the present system (or parts of it) can be deployed. For instance, a mobile device can be deployed in the operator compartment of machine 102 for use in generating, processing, or displaying the data. FIGS. 6-7 are examples of handheld or mobile devices.

FIG. 5 provides a general block diagram of the components of a client device 16 that can run some components shown in FIG. 1 that interacts with them, or runs some and interacts with some. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 110 from FIG. 1) along a bus 19 that is also connected to memory 21 and input/output (I/O) components 23, as well as clock 25 and location system 27.

I/O components 23, in one embodiment, are provided to facilitate input and output operations and the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also provide timing functions for processor 17.

Illustratively, location system 27 includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
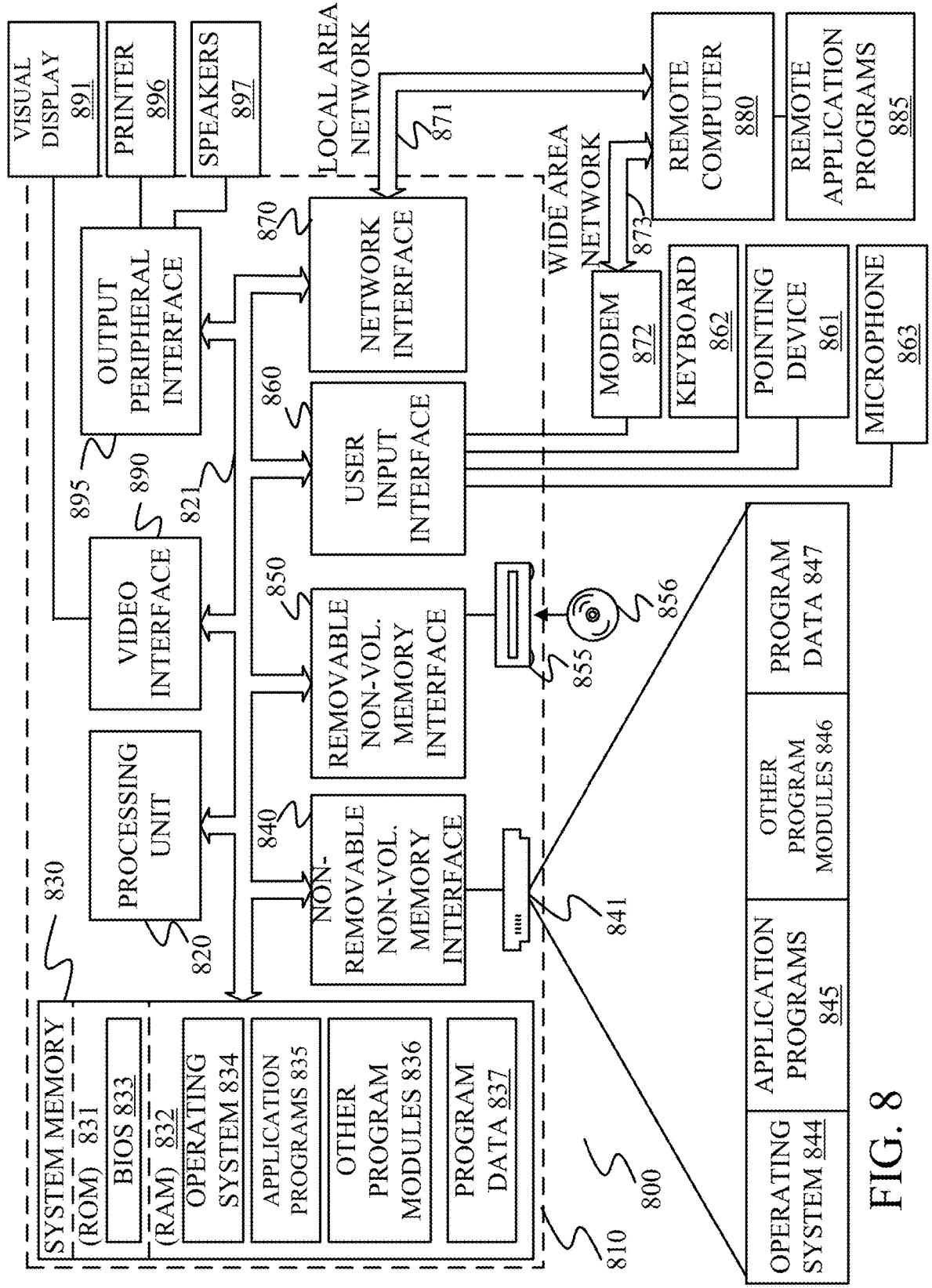
FIG. 8 is a block diagram of a computing environment that can be used in the architecture shown in previous Figures.

FIG. 8 is one example of a computing environment in which elements of FIG. 1, or parts of it (for example), can be deployed. With reference to FIG. 8, an example system for implementing some embodiments includes a general-purpose computing device in the form of a computer 810. Components of computer 810 may include, but are not limited to, a processing unit 820 (which can comprise processor 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS) containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable and volatile/nonvolatile computer storage media. By way of example only, FIG. 8 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite receiver, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections, such as a Local Area Network (LAN) or Wide Area Network (WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a control system, comprising:
data accessing logic that accesses a set of machine-generated data, generated by a sensor on a mobile machine, and identifies a data container indicative of a characteristic of an area from which the machine-generated data was obtained, based on container metadata in the set of data, and a data value indicative of a value of a sensed variable sensed by the sensor;
a data quality checking system that identifies a set of data quality checking criteria, based on a type of the data value, and checks for an error in the data value based on the identified data quality checking criteria;
and control signal generator logic that generates an action signal based on any errors in the data value.

Example 2 is the control system of any or all previous examples and further comprising:
a container integrity processing system that identifies a set of container integrity checking criteria based on the identified data container, and checks for an error in the data value based on the set of container integrity checking criteria and the container metadata;

Example 3 is the control system of any or all previous examples and further comprising:
result output logic configured to output a result from the data quality checking system and the container integrity processing system, the result having an error indicator indicative of any error corresponding to the set of machine-generated data.

Example 4 is the control system of any or all previous examples and further comprising:
a quarantined data store, the result output logic being configured to determine whether the error indicator corresponding to the set of machine-generated data indicates an error and, if so, store the set of machine-generated data in the quarantined data store.

Example 5 is the control system of any or all previous examples and further comprising:
correction rule identification logic configured to access data stored in the quarantined data store and identify a correction rule based on the corresponding error indicator; and
rule application logic configured to apply the identified correction rule to the data accessed from the quarantined data store.

Example 6 is the control system of any or all previous examples wherein the container integrity processing system comprises:
a data completeness determination system that determines a completeness level of the set of machine-generated data based on the identified data container and generates a completeness output based on the completeness level.

Example 7 is the control system of any or all previous examples wherein the data completeness determination system comprises:
temporal checking logic configured to identify a temporal completeness level indicative of a temporal completeness of the set of machine-generated data; and
geospatial checking logic configured to identify a geospatial completeness level indicative of a geospatial completeness of the set of machine-generated data, the completeness output being indicative of the temporal completeness level and the geospatial completeness level.

Example 8 is the control system of any or all previous examples wherein the container integrity processing system comprises:
   container violation detector logic configured to determine whether the container metadata violates any container integrity checking criteria, based on the identified data container.

Example 9 is the control system of any or all previous examples wherein the data quality checking criteria comprise static range checking criteria indicative of a fixed range of expected values for the data value, based on the type of the data value, and wherein the data quality checking system comprises:
   static range checking logic that identifies whether the data value falls outside of the fixed range and, if so identifies an error type for the data value.

Example 10 is the control system of any or all previous examples wherein the data quality checking criteria comprise signal dynamics criteria indicative of an expected signal dynamics characteristic of the data value, based on the type of the data value, and wherein the data quality checking system comprises:
   signal dynamics processing logic configured to identify a change in the data value over time and whether the change in the data value over time deviates from the expected signal dynamics characteristic and, if so identify an error type for the data value.

Example 11 is the control system of any or all previous examples wherein the data quality checking criteria comprise signal drift criteria indicative of an expected signal drift characteristic of the data value, based on the type of the data value, and wherein the data quality checking system comprises:
   signal drift behavior processing logic configured to identify a signal drift characteristic corresponding to the data value and whether the signal drift characteristic for the data value over time deviates from the expected signal drift characteristic and, if so identify an error type for the data value.

Example 12 is the control system of any or all previous examples wherein the data quality checking criteria comprise data logic dependency criteria indicative of an expected dependency of the data value on an underlying data value in the set of machine-generated data, based on the type of the data value, and wherein the data quality checking system comprises:
   a data logic dependency analyzer configured to identify whether the data value varies with the underlying data value, according to the expected dependency and, if not, identify an error type for the data value.

Example 13 is the control system of any or all previous examples wherein the data quality checking criteria comprise application context criteria indicative of an expected data value behavior based on a context of a machine on which the set of machine-generated data was generated, and based on the type of the data value, and wherein the data quality checking system comprises:
   application context checking logic configured to identify whether the data value deviates from the expected data value behavior and, if so, identify an error type for the data value.

Example 14 is a method, comprising:
   accessing a set of machine-generated data, generated by a sensor on a mobile machine; identifying a data container indicative of a type of area from which the machine generated data was obtained, based on container metadata in the set of data;
   identifying a data value indicative of a value of a sensed variable sensed by the sensor; obtaining a set of data quality checking criteria, based on a type of the data value; checking for an error in the data value based on the identified data quality checking criteria;
   obtaining a set of container integrity checking criteria based on the identified data container;
   checking for an error in the data value based on the set of container integrity checking criteria and the container metadata; and generating an action signal based on any errors in the data value.

Example 15 is the method of any or all previous examples and further comprising:
   generating a result having an error indicator indicative of any error corresponding to the set of machine-generated data.

Example 16 is the method of any or all previous examples and further comprising:
   determining whether the error indicator corresponding to the set of machine-generated data indicates an error;
   if so, storing the set of machine-generated data in a quarantined data store;
   accessing data stored in the quarantined data store;
   identifying a correction rule based on the corresponding error indicator; and applying the identified correction rule to the data accessed from the quarantined data store.

Example 17 is the method of any or all previous examples wherein checking for an error based on the container integrity checking criteria comprises:
   identifying a temporal completeness level indicative of a temporal completeness of the set of machine-generated data;
   identifying a geospatial completeness level indicative of a geospatial completeness of the set of machine-generated data; and outputting a completeness output indicative of the temporal completeness level and the geospatial completeness level.

Example 18 is the method of any or all previous examples wherein the data quality checking criteria comprise static range checking criteria indicative of a fixed range of expected values for the data value, based on the type of the data value, and wherein checking for an error based on the data quality checking criteria comprises:
   identifying whether the data value falls outside of the fixed range; and
   if so, identifying an error type corresponding to the data value.

Example 19 is the method of any or all previous examples wherein the data quality checking criteria comprise signal dynamics criteria indicative of an expected signal dynamics characteristic of the data value, based on the type of the data value, and signal drift criteria indicative of an expected signal drift characteristic of the data value, based on the type of the data value, and wherein checking for an error based on the data quality checking criteria comprises:
   identifying a change in the data value over time and whether the change in the data value over time deviates from the expected signal dynamics characteristic;
   if so, identifying an error type corresponding to the data value;
   identifying a signal drift characteristic corresponding to the data value and whether the signal drift characteristic corresponding to the data value over time deviates from the expected signal drift characteristic; and if so, identifying an error type for the data value.

Example 20 is a machine-generated control system on a mobile machine, comprising:

data accessing logic that accesses a set of machine-generated data, generated by a sensor on the mobile machine, and identifies a data container indicative of a type of area from which the machine-generated data was obtained, based on container metadata in the set of data, and a data value indicative of a value of a sensed variable sensed by the sensor;

a data quality checking system that identifies a set of data quality checking criteria, based on a type of the data value, and checks for an error in the data value based on the identified data quality checking criteria;

a container integrity processing system that identifies a set of container integrity checking criteria based on the identified data container, and checks for an error in the data value based on the set of container integrity checking criteria and the container metadata;

a quarantined data store storing machine-generated data for which an error has been identified, along with an error indicator corresponding to the set of machine-generated data indicates the identified error;

correction rule identification logic configured to access data stored in the quarantined data store and identify a correction rule based on the corresponding error indicator;

rule application logic configured to apply the identified correction rule to the data accessed from the quarantined data store to obtain corrected data; and control signal generator logic that generates an action signal based on any uncorrected errors in the set of machine generated data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system of a mobile machine, comprising:
a data checking and correction system, executable on one or more computer processors, configured to identify inaccuracies within a set of machine-generated data, comprising:
data accessing logic that accesses the set of machine-generated data, generated by a sensor on the mobile machine, and identifies a data container indicative of a characteristic of an area from which the machine-generated data was obtained, based on container metadata in the set of data, and a data value indicative of a value of a sensed variable sensed by the sensor;
a data quality checking system that identifies a set of data quality checking criteria, based on a type of the data value, and checks for an error in the data value based on the identified data quality checking criteria;
a data completeness determination system including temporal checking logic that determines a temporal completeness level of the set of machine-generated data based on the identified data container, the temporal completeness level indicating whether there is a gap in the set of machine-generated data generated by the sensor on the mobile machine, and the data completeness determination system generating a completeness output based on the temporal completeness level; and
control signal generator logic that generates an action signal for a control system of the mobile machine based on any errors in the data value, and based on the completeness output.

2. The control system of claim 1 and further comprising:
a container integrity processing system that identifies a set of container integrity checking criteria based on the identified data container, and checks for an error in the data value based on the set of container integrity checking criteria and the container metadata.

3. The control system of claim 2 and further comprising:
result output logic configured to output a result from the data quality checking system and the container integrity processing system, the result having an error indicator indicative of any error corresponding to the set of machine-generated data.

4. The control system of claim 3 and further comprising:
a quarantined data store, the result output logic being configured to determine whether the error indicator corresponding to the set of machine-generated data indicates an error and, if so, store the set of machine-generated data in the quarantined data store.

5. The control system of claim 4 and further comprising:
correction rule identification logic configured to access data stored in the quarantined data store and identify a correction rule based on the corresponding error indicator; and
rule application logic configured to apply the identified correction rule to the data accessed from the quarantined data store.

6. The control system of claim 1 wherein the data completeness determination system comprises:
geospatial checking logic configured to identify a geospatial completeness level indicative of a geospatial gap in the set of machine-generated data, the geospatial gap being a geospatial location for which machine-generated data is missing from the set of machine-generated data, the completeness output being indicative of the temporal completeness level and the geospatial completeness level.

7. The control system of claim 2 wherein the container integrity processing system comprises:
container violation detector logic configured to determine whether the container metadata violates any container integrity checking criteria, based on the identified data container.

8. The control system of claim 2 wherein the data quality checking criteria comprise static range checking criteria indicative of a fixed range of expected values for the data value, based on the type of the data value, and wherein the data quality checking system comprises:
static range checking logic that identifies whether the data value falls outside of the fixed range and, if so identifies an error type for the data value.

9. The control system of claim 2 wherein the data quality checking criteria comprise signal dynamics criteria indicative of an expected signal dynamics characteristic of the data value, based on the type of the data value, and wherein the data quality checking system comprises:
signal dynamics processing logic configured to identify a change in the data value over time and whether the change in the data value over time deviates from the expected signal dynamics characteristic and, if so identify an error type for the data value.

10. The control system of claim 2 wherein the data quality checking criteria comprise signal drift criteria indicative of an expected signal drift characteristic of the data value, based on the type of the data value, and wherein the data quality checking system comprises:
  signal drift behavior processing logic configured to identify a signal drift characteristic corresponding to the data value and whether the signal drift characteristic for the data value over time deviates from the expected signal drift characteristic and, if so identify an error type for the data value.

11. The control system of claim 2 wherein the data quality checking criteria comprise data logic dependency criteria indicative of an expected dependency of the data value on an underlying data value in the set of machine-generated data, based on the type of the data value, and wherein the data quality checking system comprises:
  a data logic dependency analyzer configured to identify whether the data value varies with the underlying data value, according to the expected dependency and, if not, identify an error type for the data value.

12. The control system of claim 2 wherein the data quality checking criteria comprise application context criteria indicative of an expected data value behavior based on a context of a machine on which the set of machine-generated data was generated, and based on the type of the data value, and wherein the data quality checking system comprises:
  application context checking logic configured to identify whether the data value deviates from the expected data value behavior and, if so, identify an error type for the data value.

13. A method of controlling a machine by identifying inaccuracies within a set of machine-generated data, executable on one or more processors, comprising:
  accessing the set of machine-generated data, generated by a sensor on a mobile machine;
  identifying a data container indicative of a type of area from which the set of machine-generated data was obtained, based on container metadata in the set of data;
  identifying a data value indicative of a value of a sensed variable sensed by the sensor;
  obtaining a set of data quality checking criteria, based on a type of the data value;
  checking for an error in the data value based on the identified data quality checking criteria;
  obtaining a set of container integrity checking criteria based on the identified data container;
  checking for an error in the data value based on the set of container integrity checking criteria and the container metadata, comprising:
    identifying a temporal completeness level indicative of a temporal completeness of the set of machine-generated data by identifying a time period for which machine-generated data is missing from the set of machine-generated data; and
  generating an action signal for a control system of the mobile machine based on any errors in the data value, and based on the temporal completeness level.

14. The method of claim 13 and further comprising:
  generating a result having an error indicator indicative of any error corresponding to the set of machine-generated data.

15. The method of claim 14 and further comprising:
  determining whether the error indicator corresponding to the set of machine-generated data indicates an error;
  if so, storing the set of machine-generated data in a quarantined data store;
  accessing data stored in the quarantined data store;
  identifying a correction rule based on the corresponding error indicator; and
  applying the identified correction rule to the data accessed from the quarantined data store.

16. The method of claim 13 wherein checking for the error based on the container integrity checking criteria further comprises:
  identifying a geospatial completeness level indicative of a geospatial completeness of the set of machine-generated data; and
  outputting a completeness output indicative of the temporal completeness level and the geospatial completeness level.

17. The method of claim 13, wherein the data quality checking criteria comprise static range checking criteria indicative of a fixed range of expected values for the data value, based on the type of the data value, and wherein checking for an error based on the data quality checking criteria comprises:
  identifying whether the data value falls outside of the fixed range; and
  if so, identifying an error type corresponding to the data value.

18. The method of claim 13 wherein the data quality checking criteria comprise signal dynamics criteria indicative of an expected signal dynamics characteristic of the data value, based on the type of the data value, and signal drift criteria indicative of an expected signal drift characteristic of the data value, based on the type of the data value, and wherein checking for an error based on the data quality checking criteria comprises:
  identifying a change in the data value over time and whether the change in the data value over time deviates from the expected signal dynamics characteristic;
  if so, identifying an error type corresponding to the data value;
  identifying a signal drift characteristic corresponding to the data value and whether the signal drift characteristic corresponding to the data value over time deviates from the expected signal drift characteristic; and
  if so, identifying an error type for the data value.

19. A machine-generated control system on a mobile machine, comprising:
  a data checking and correction system, executable on one or more computer processors, configured to identify inaccuracies within a set of machine-generated data, comprising:
    data accessing logic that accesses the set of machine-generated data, generated by a sensor on the mobile machine, and identifies a data container indicative of a type of area from which the machine-generated data was obtained, based on container metadata in the set of data, and a data value indicative of a value of a sensed variable sensed by the sensor;
    a data quality checking system that identifies a set of data quality checking criteria, based on a type of the data value, and checks for an error in the data value based on the identified data quality checking criteria;
    a container integrity processing system that identifies a set of container integrity checking criteria based on the identified data container, and checks for an error in the data value based on the set of container integrity checking criteria and the container metadata;
    a data completeness determination system that determines a temporal and geospatial completeness level of the set of machine-generated data based on the identified data container and generates a completeness output based on the temporal and geospatial completeness level, the data completeness determination system including:
- temporal checking logic that identifies the temporal completeness level indicative of a temporal gap in the set of machine-generated data; and
- geospatial checking logic that identifies the geospatial completeness level indicative of a geospatial gap in the set of machine-generated data;

a quarantined data store storing machine-generated data for which an error has been identified, along with an error indicator corresponding to the set of machine-generated data indicates the identified error;

correction rule identification logic configured to access data stored in the quarantined data store and identify a correction rule based on the corresponding error indicator;

rule application logic configured to apply the identified correction rule to the data accessed from the quarantined data store to obtain corrected data; and control signal generator logic that generates an action signal for a control system of the mobile machine based on any corrected errors in the set of machine-generated data, and based on the completeness output from the temporal completeness level and the geospatial completeness level.

* * * * *